(12) United States Patent
Schumacher et al.

(10) Patent No.: US 12,392,607 B2
(45) Date of Patent: Aug. 19, 2025

(54) INTELLIGENT DROP TABLE

(71) Applicant: Nabholz Construction Corporation, Conway, AR (US)

(72) Inventors: Stephen H. Schumacher, Sandy Hook, CT (US); Karl Ifert-Miller, Newtown, CT (US)

(73) Assignee: Nabholz Construction Corporation, Conway, AR (US)

( * ) Notice: Subject to any disclaimer, the term of this patent is extended or adjusted under 35 U.S.C. 154(b) by 944 days.

(21) Appl. No.: 17/356,780

(22) Filed: Jun. 24, 2021

(65) Prior Publication Data

US 2021/0404805 A1 Dec. 30, 2021

Related U.S. Application Data

(60) Provisional application No. 62/705,406, filed on Jun. 25, 2020.

(51) Int. Cl.
| | |
|---|---|
| *G01C 9/02* | (2006.01) |
| *B61K 5/00* | (2006.01) |
| *B61K 5/02* | (2006.01) |
| *B66F 11/00* | (2006.01) |
| *B66F 11/04* | (2006.01) |
| *G01C 9/26* | (2006.01) |
| *G01C 9/28* | (2006.01) |
| *B61K 13/00* | (2006.01) |

(52) U.S. Cl.
CPC ............. *G01C 9/02* (2013.01); *B61K 5/00* (2013.01); *B61K 5/02* (2013.01); *B66F 11/00* (2013.01); *B66F 11/04* (2013.01); *B66F 11/042* (2013.01); *B66F 11/044* (2013.01); *B66F 11/046* (2013.01); *B66F 11/048* (2013.01); *G01C 9/26* (2013.01); *G01C 9/28* (2013.01); *B61K 13/00* (2013.01)

(58) Field of Classification Search
CPC .. B61K 5/00; B61K 5/02; B61K 13/00; B66F 11/00; B66F 11/04; B66F 11/042; B66F 11/044; B66F 11/046; B66F 11/048; B66F 7/22; G01C 9/02; G01C 9/28; G01C 9/26
USPC ..................... 104/32.1, 30, 35, 42
See application file for complete search history.

(56) References Cited

U.S. PATENT DOCUMENTS

| | | | |
|---|---|---|---|
| 2,301,579 A * | 11/1942 | Plant ........................ | B61K 5/00 104/32.1 |
| 2,651,265 A * | 9/1953 | Richardson .............. | B61K 5/00 104/32.1 |
| 6,880,258 B2 | 4/2005 | Adams et al. | |

(Continued)

FOREIGN PATENT DOCUMENTS

| | | | | |
|---|---|---|---|---|
| CA | 2897863 A1 * | 2/2016 | ............... | B61K 5/00 |
| CN | 110352329 A * | 10/2019 | ............... | G01C 9/02 |

*Primary Examiner* — S. Joseph Morano
*Assistant Examiner* — James William Jones
(74) *Attorney, Agent, or Firm* — Hall Estill Law Firm (57) ABSTRACT

A drop table system can intelligently provide truck assembly movement with a controller connected to at least one lifting column and a single inclinometer with the inclinometer positioned at a geometric center of a drop table platform. The drop table platform can be suspended with the at least one lifting column prior to a detection of drop table platform tilt with the inclinometer. The tilt may be corrected by altering operation of the at least one lifting column to orient the drop table platform in a level configuration.

28 Claims, 5 Drawing Sheets

(56) References Cited

U.S. PATENT DOCUMENTS

| | | |
|---|---|---|
| 7,650,252 B2 | 1/2010 | Douglas |
| 8,860,765 B2 | 10/2014 | Kilpatrick, II et al. |
| 9,182,470 B2 | 11/2015 | Heckendorn |
| 10,088,311 B2 | 10/2018 | Eskew |
| 10,429,851 B2 | 10/2019 | Shamlian et al. |
| 10,632,642 B2 | 4/2020 | Butler et al. |
| 10,993,772 B2 | 5/2021 | Itkowitz et al. |
| 2004/0021099 A1* | 2/2004 | Figueria ............ G01C 9/02 250/559.37 |
| 2010/0315070 A1* | 12/2010 | Hong ................ G01C 9/12 33/365 |
| 2015/0166313 A1* | 6/2015 | Knapp ............... B66F 11/04 254/89 R |
| 2016/0377649 A1* | 12/2016 | Rytkönen ........... G01C 9/06 73/514.32 |
| 2017/0108336 A1* | 4/2017 | Boysel .............. G01C 19/5719 |
| 2019/0277871 A1* | 9/2019 | Sato ................. G01P 1/006 |
| 2019/0316903 A1* | 10/2019 | Sato ................. G01C 19/5783 |
| 2021/0261403 A1* | 8/2021 | Gattere .............. G01C 9/00 |

\* cited by examiner

INTELLIGENT DROP TABLE

RELATED APPLICATIONS

The present application makes a claim of domestic priority to U.S. Provisional Patent Application No. 62/705,406 filed Jun. 2, 2020, the contents of which are hereby incorporated by reference.

SUMMARY

An intelligent drop table, in accordance with various embodiments, has a drop table platform suspended by at least one lifting column connected to a controller. The controller is connected to a single inclinometer positioned at a geometric center of the drop table platform to identify tilt of the drop table platform.

An intelligent drop table, in other embodiments, has a controller connected to at least one lifting column and a single inclinometer with the inclinometer positioned at a geometric center of a drop table platform. The drop table platform is suspended with the at least one lifting column prior to a detection of drop table platform tilt with the inclinometer. The tilt is then corrected by altering operation of the at least one lifting column to orient the drop table platform in a level configuration.

DETAILED DESCRIPTION

The present disclosure is generally directed to a drop table that employs intelligent structure and function to optimize the servicing of rail car truck assemblies.

Despite the modernization of railway equipment, the truck assemblies that house one or more traction motors and connect a rail car and/or locomotive to rails need service after an amount of use. Such service involves separating a truck assembly from a rail car prior to performing repair, maintenance, and replacement of assorted assembly components. The separation of a truck assembly can be wrought with safety, efficiency, and performance issues associated with moving the truck assembly to, and from, a service station. Hence, various embodiments are directed to increasing the safety, efficiency, and performance of a drop table system that physically moves a truck assembly.

Figure 1:
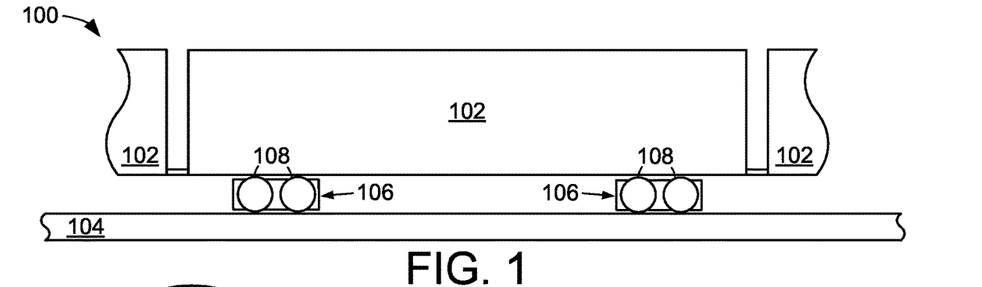
FIG. 1 is a representation of an example environment in which assorted embodiments can be practiced.

FIG. 1 displays a line representation of an example locomotive system 100 in which various embodiments of the present disclosure can be practiced. The locomotive system 100 can consist of any number of locomotive engines or rail cars 102 positioned atop a pair of rails 104. Each rail car 102 can employ at least one truck assembly 106 that provide suspension of at least one traction motor as well as rolling engagement between the rails 104 and the respective rail cars and locomotive engines 102. It is noted that each truck assembly 106 has a multiple wheels 108 that physically engage the rails 104, but such configuration is not required or limiting as any number of wheels can be utilized to allow a rail car to move along the rails 104.

The use of truck assemblies 106 with suspensions and multiple wheels 108 allow relatively heavy loads to be efficiently transported via locomotive power. However, heavy loads and relatively long transportation distances result in wear on the truck assemblies 106 that require service, such as inspection, maintenance, component repair, and component replacement, in order to provide consistent and safe transportation performance over time. Such service can be daunting and riddled with challenges due, at least in part, to the size, weight, and position of the truck assemblies relative to the other portions of the respective rail cars 102.

Figure 2:
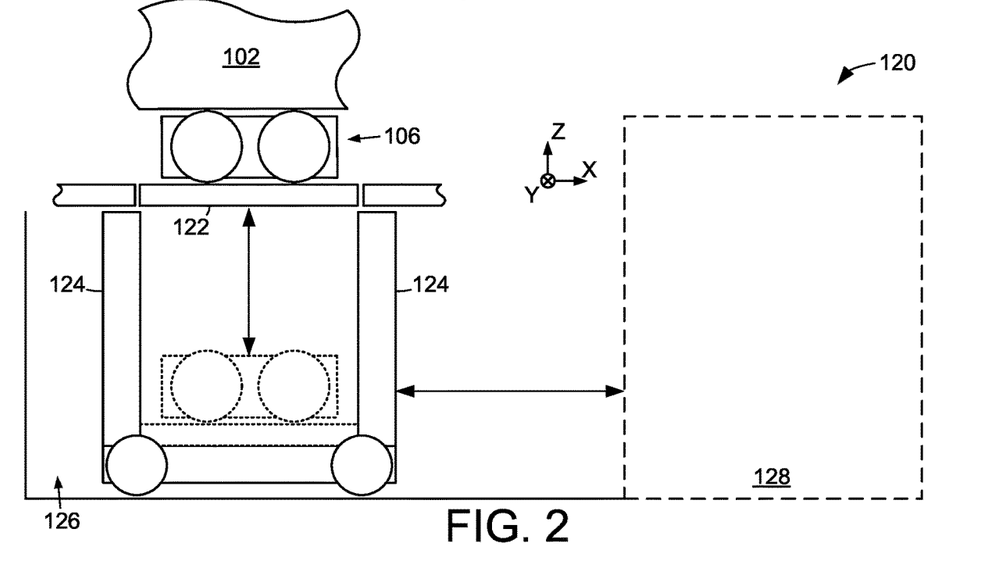
FIG. 2 depicts portions of an example drop table operated in accordance with assorted embodiments.

FIG. 2 depicts portions of an example drop table system 120 operated in accordance with assorted embodiments to service portions of a rail car 102. The drop table system 120 separates a truck assembly 106 from a non-rotating portion of the rail car 102 by lowering a section of rail 122 via one or more jacks 124. In some embodiments, independent lifting jacks 124 provide selective operation to raise or lower a truck assembly 106 with respect to a recessed drop table pit 126 along a vertical axis (Z axis). The drop table pit 126 can be configured for horizontal movement (X axis) to align the truck assembly 106 with a service shaft 128. The position of the service shaft 128 away from the rail car 102 allows for unimpeded access to the truck assembly 106, which results in efficient inspection, access, and replacement of various portions of the truck assembly 106.

While use of the service shaft 128 provides efficient servicing of a truck assembly 106, the two-dimensional movement of the lifting jacks 124 along the Z and X axes, respectively, corresponds with increased mechanical complexity that can be prone to reliability, safety, and performance issues compared to one-dimensional lifting columns that simply perform vertical motion. For instance, a two-dimensional jack 124 can be plagued with failures while in the pit 126, which can be difficult and time consuming to repair and overcome. A two-dimensional jack 124 may also be plagued with stabilizing a truck assembly 106 for both vertical (Z axis) and horizontal (X axis) movement, which can jeopardize the integrity of the truck assembly 106 as well as the function of the jacks 124 in the event of inadvertent truck assembly 106 motion.

In addition to the difficulties inherent in moving heavy truck assemblies 106 in two-dimensions, the use of truck assemblies 106 is inherently dirty. Thus, the drop table lifting jacks 124 routinely experience unbalanced and heavy loads that expel dirt, debris, and contaminated liquids onto the jacks 124. The presence of such contaminants may further exacerbate the difficulties of a two-dimensional jack 124 by contaminating moving portions of a jack 124, creating slippery surfaces, and exposing electrical components to liquid. Accordingly, two-dimensional jacks 124 can be constructed to be robust against contamination and wear due to dirty and heavy truck assemblies 106. However, such robust construction corresponds with slow operation and parts that are difficult to access and repair.

Figure 3A:
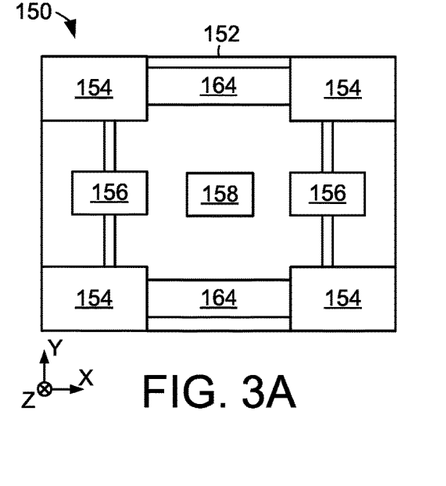
FIGS. 3A & 3B respectively depict portions of an example drop table configured in accordance with various embodiments.
Figure 3B:
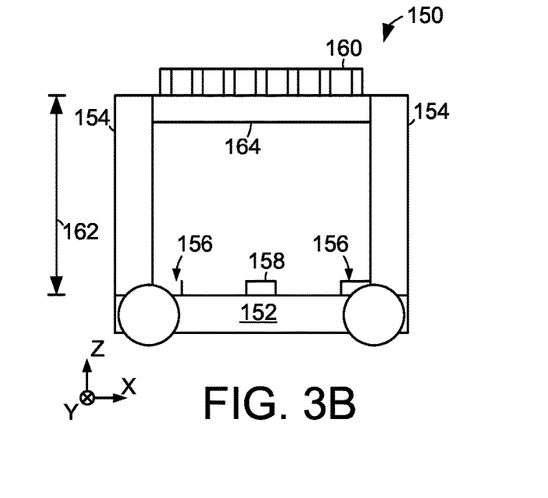

Hence, drop table systems 120 have been configured with a balance of robustness for contamination and wear versus speed and performance of operation. Assorted embodiments of an intelligent drop table alleviate this compromising balance by providing a more efficient two-dimensional jack that maintains robust resistance to contamination and wear over time. FIGS. 3A & 3B respectively depict portions of an example drop table 150 arranged in accordance with some embodiments. The top view line representation of the drop table 150 in FIG. 3A illustrates how a base 152 can support a plurality of lifting columns 154 and lifting motors 156.

While not required or limiting, a pair of lifting columns 154 can each be powered by a motor 156 disposed therebetween on the base 152, as directed by an electronic controller 158. By constructing the base 152 as a rigid member, the respective lifting columns 154 can more reliably be supported to lift, and lower, heavy loads compared to if the columns 154 were physically independent of the base 152. The base 152 may further support one or more gear boxes between the respective motors 156 and a connected column 154, which allows for increased mechanical efficiency compared to a direct drive (gearless) motor-column connection.

The respective lifting columns 154 can each be physically attached to a lifting platform 160, as shown in FIG. 3B, that contacts a truck assembly to be moved by the drop table 150. It is contemplated that the lifting platform 160 is mounted directly to each lifting column 154, but such configuration can result in an unstable movement mechanism along with a relatively long travel distance, as shown by arrow 162 that corresponds with a pit depth and a length of lifting/lowering for the columns 154. Accordingly, various embodiments link lifting columns 154 on the same longitudinal side of the base 152 with a crossbeam 164 that joins the operation of the respectively connected lifting columns 154.

The configuration of a crossbeam 164 to connect two lifting columns 154, instead of three or more columns 154, allows the motors 156 to be linked without overpowering the respective motors 156. That is, joining lifting columns 154 connected to different motors 156 allows for efficient, precise, and safe lifting and lowering operation compared to columns powered independently or a single motor powering all columns 154. For instance, bilateral lifting control afforded by the crossbeams 164 allow different motors 156 to balance lifting, and lowering, motion along the longitudinal axis (X axis), which can accommodate shifting loads, equipment wear, and component failures.

In some embodiments, the crossbeams 164 can extend parallel to the Y axis to connect a pair of lifting columns 154 powered by the same motor 156 instead of the crossbeam 164 configuration shown in FIGS. 3A & 3B. The connection of columns 154 powered by a common motor 156 can increase stability of the drop table system 150, but can be plagued by shifting loads, particularly when the drop table system 150 moves along the X axis to a service pit. The use of crossbeams 164, regardless of orientation, in combination with the platform 160 oriented with beams extending perpendicular to the longitudinal axis of the crossbeams 164 increases the overall strength and stability of the drop table system 150 while reducing the depth of the service pit and the length of the respective lifting columns 154.

Figure 4:
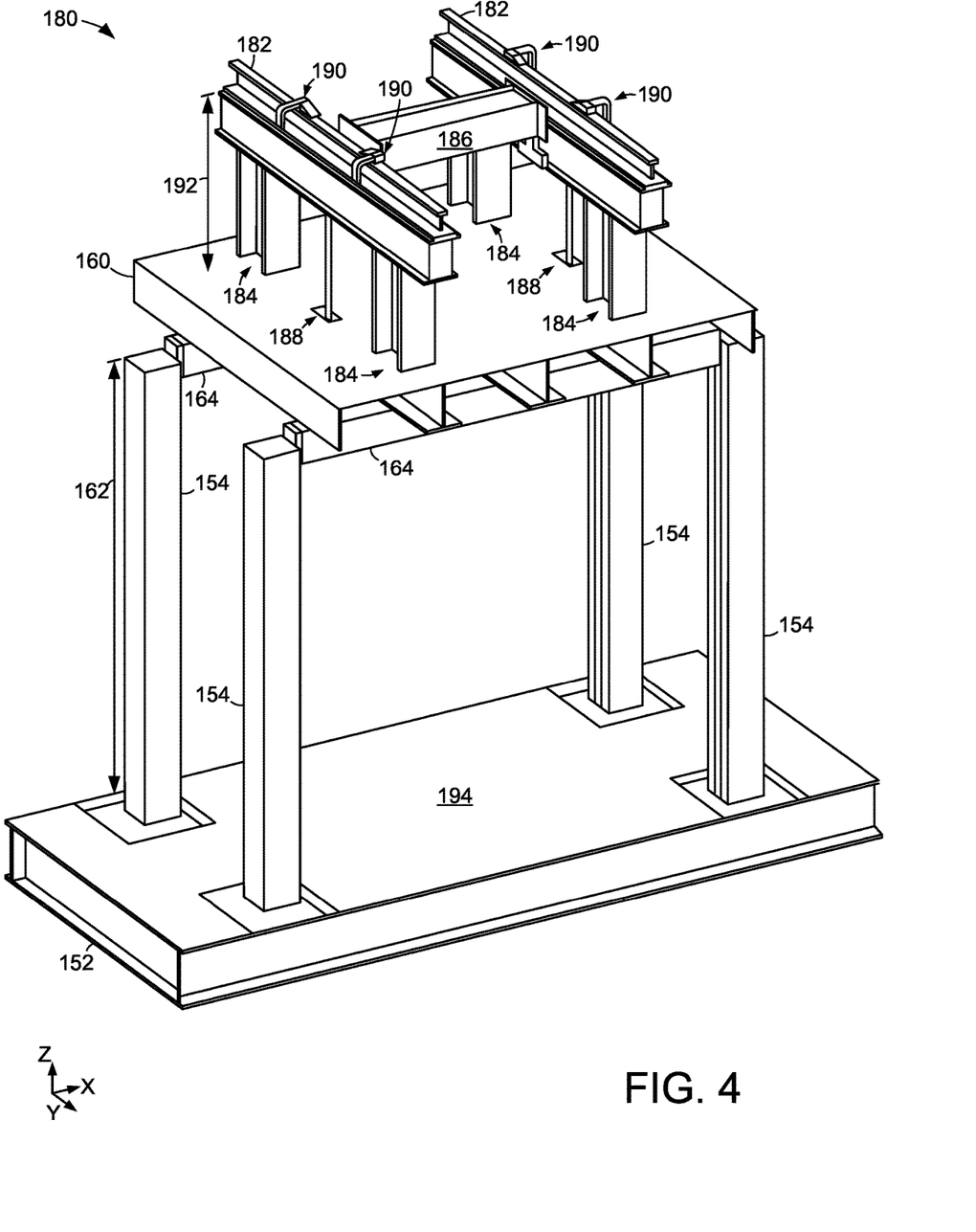
FIG. 4 depicts portions of an example drop table arranged in accordance with some embodiments.

FIG. 4 depicts portions of an example drop table 180 configured in accordance with various embodiments. The drop table 180 can be positioned below rails in a pit that allows for vertical (Z axis) and horizontal (X axis) movement to separate a truck assembly from a rail car, service the truck assembly, and return the truck assembly to the rail car. Such activity can be facilitated by a pair of rail sections that each consist of a length of rail 182 supported by a stanchion 184. Each stanchion 184 is supported by a rail crossbeam 186 that ensures the stanchions 184 remain a predetermined distance apart, as measured along the X axis, during movement of a truck assembly.

The stanchions 184 are each configured with manual locks 188 that engages the platform 160 to support the truck assembly, and attached rail car, which prevents rollovers and inadvertent weight transfer when detaching and installing the truck assembly. The manual locks 188 can be complemented by adjustable wheel chocks 190 that secure the position of the truck assembly by contacting at least one truck wheel. While not required, the wheel chocks 190 can be adjusted to place more, or less, force on the truck assembly, which can restrict, or allow, truck assembly motion during drop table 180 movement and operation.

The height 192 of the stanchions 184 can be customized, in accordance with various embodiments, to reduce the depth of the service pit and the length of travel for the respective lifting columns 154. That is, the combination of the crossbeams 164 supporting the platform 160 that supports the stanchions 184 adds height above the lifting limit of the columns 154, as established by the X-Y plane at the top of the respective crossbeams 164, that reduces the distance needed to bring a truck assembly into the service pit to be translated horizontally. Hence, the height, parallel to the Z axis, of the platform 160 and stanchions 184 can be tuned to provide enough distance to effectively reduce the depth of the service pit and operating length of the lifting columns 154 without compromising truck assembly stability or drop table operating safety due to the crossbeams 164 minimizing side loading by transferring weight directly to the top of a lifting nut that travels within each lifting column 154.

The configuration of the platform 160 atop the crossbeams 164 allows for the efficient removal of a truck assembly and/or traction motor from a locomotive engine or rail car. For instance, the additional height of the platform 160 allows the suspension holding a truck assembly/traction motor to a engine/rail car to be easily compressed along the Z axis without the crossbeams 164 being at the very top of the range of the lifting columns 154, which increases safety and efficiency. That is, a truck assembly and/or traction motor can be reliably moved upward by the platform 160 to allow the truck assembly/motor to be disconnected from the engine/car prior to being lowered by the lifting columns.

It is noted that the base 152 is covered with a solid plate 194 that protects the electrical components, such as the motors, controller, and moving components, housed in the base 152. In addition, the solid plate 194 provides a safe walking surface when servicing the drop table 180. With the presence of dirt, liquids, and other contaminants that can degrade and fail electrical and mechanical components of the lifting columns 154 and base 152, the combination of the continuously solid platform 160 and base along the X-Y plane presents barriers for such contaminants from entering, interfering, degrading, and failing portions of the drop table 180.

Figure 5:
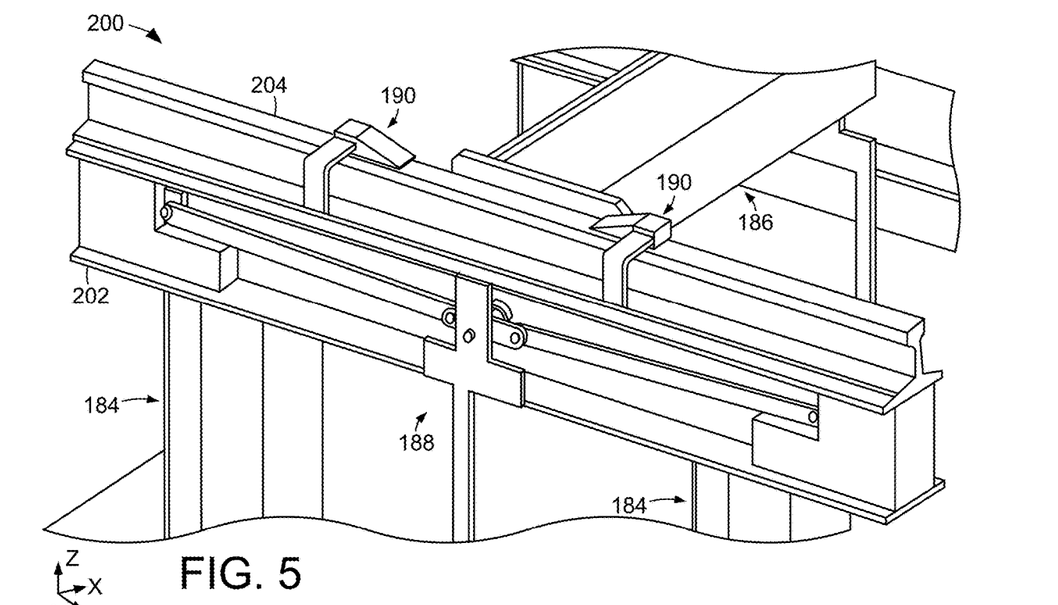
FIG. 5 depicts a service top portion of an example drop table configured in accordance with assorted embodiments.

FIG. 5 depicts a service top 200 portion of an example drop table arranged in accordance with assorted embodiments. The service top 200 has a welded structural beam 202 and utilizes a rail 204 having a standardize size and shape to provide continuity with rails utilized in service shops. The manual lock 188 extends through pockets in the platform 160 to stabilize the truck assembly and prevent occurrences of rollover. The adjustable wheel chocks 190 secure a truck wheel at any location on the rail 204, which allows greater customization of truck assembly stabilization than non-adjustable, single location wheel chocks, by optimizing the center-of-gravity of the platform.

Figure 6:
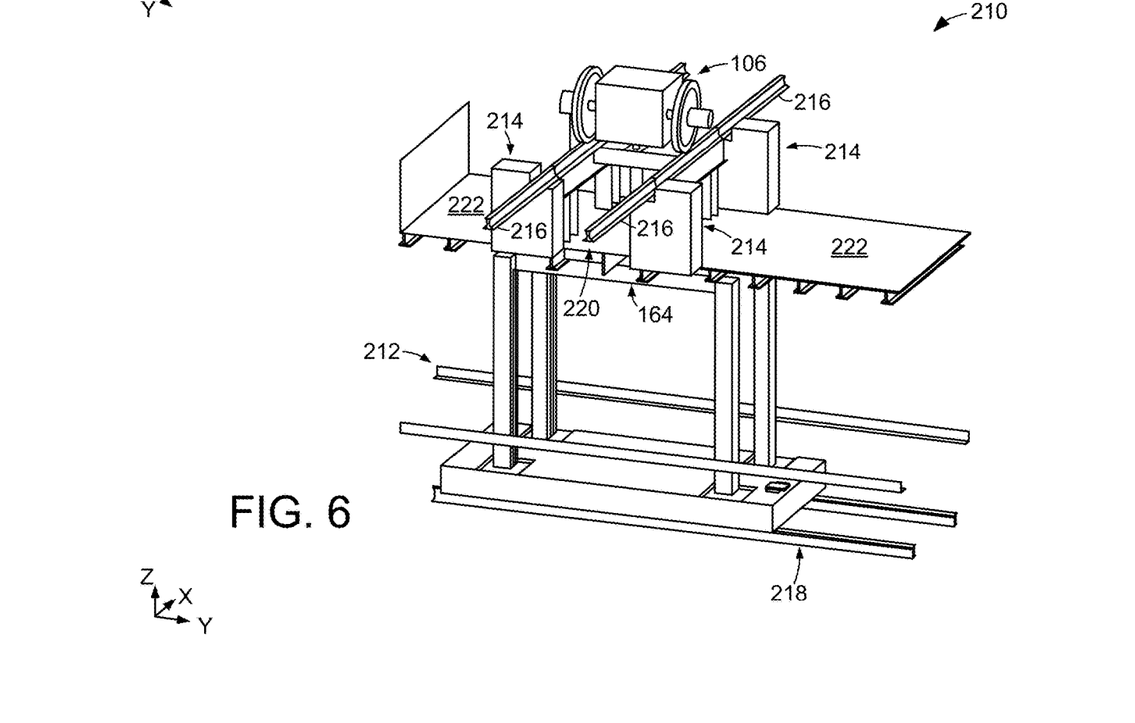
FIG. 6 depicts portions of an example drop table utilized in accordance with some embodiments.

FIG. 6 depicts portions of an example drop table system 210 positioned within a service pit 212 to carry out various embodiments of servicing a truck assembly 106. The drop table system 210 utilizes stabilizing blocks 214 connected to each non-moving rail 216 to ensure no rail movement is experienced when the truck assembly 106 is lowered onto the base 152 of the system 210 to allow horizontal motion along the pit rails 218. It is noted that the drop table base 152 may have one or more motors that power motion along the X axis via the pit rails 218.

The additional height provided by the crossbeams 164 and platform 160 allow the platform top surface 220 to be even with, aligned with, and parallel to a shop floor surface 222, which increases safety of workers while reducing contaminants from dropping onto the lifting columns 154 and base 152. It is contemplated that the space vacated by the platform when lowered onto the base 152 is filled by a safety panel that prevents people, tools, and contaminants from falling into to the service pit 212.

Figure 7:
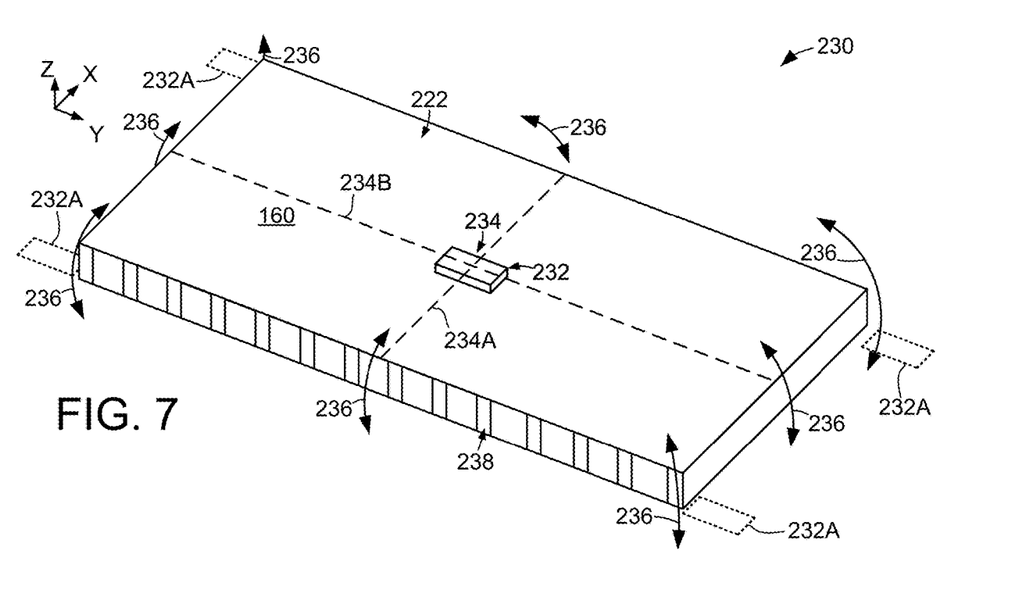
FIG. 7 depicts portions of an example drop table constructed and operated in accordance with assorted embodiments.

FIG. 7 depicts a platform 230 of an example drop table configured in accordance with some embodiments. The platform 230 employs a single inclinometer sensor 232 positioned in the geometric center 234 of the platform 230 and connected to a drop table controller, such as controller 158. The geometric center 234 of the rectangular platform 230 is disposed at the intersection of respective X and Y extending centerlines 234A, 234B. Such single inclinometer 232 replaces separate sensors located in the lifting columns, as represented by segmented boxes 232A. The use of a single sensor 232 to measure three-dimensional tilt of the platform 230 allows for efficient and precise detection of operating conditions along the periphery of the platform 230, such as at the lifting columns and along crossbeam edges, as represented by arrows 236.

It is noted that the sensor 232 can be positioned above or below the platform top surface 222 to sense platform status relative to the drop table base as well as the ground floor of the service pit. The construction of the platform 230 with numerous beams 238 provides increased stiffness throughout the top surface 222, which allows the sensor 232 to precisely sense non-level platform status, as one inch of deviation from level at any location on the periphery of the platform 230. The ability to quickly and accurately detect non-level position for any part of the platform 230 allows corrective actions to be efficiently generated and carried out to prevent undue wear on the drop table components as well as inadvertent movement of the truck assembly being transported by the platform 230.

In contrast to the use of optical or acoustic sensors that can suffer performance and/or accuracy degradation by the presence of dirt, liquid, and other contaminants, the single inclinometer sensor 232 can be a sealed unit that is protected from contaminants while being less susceptible to measurement inaccuracies due to the presence of contaminants proximal to the sensor 232. The use of a single sensor 232 in the place of multiple sensors on, and/or around, the platform 230 allows for quicker detection of non-level platform status, less controller processing, faster derivation of corrective actions to reach a level status, and simpler overall configuration that reduces risk of a sensor failure over time.

Figure 8:
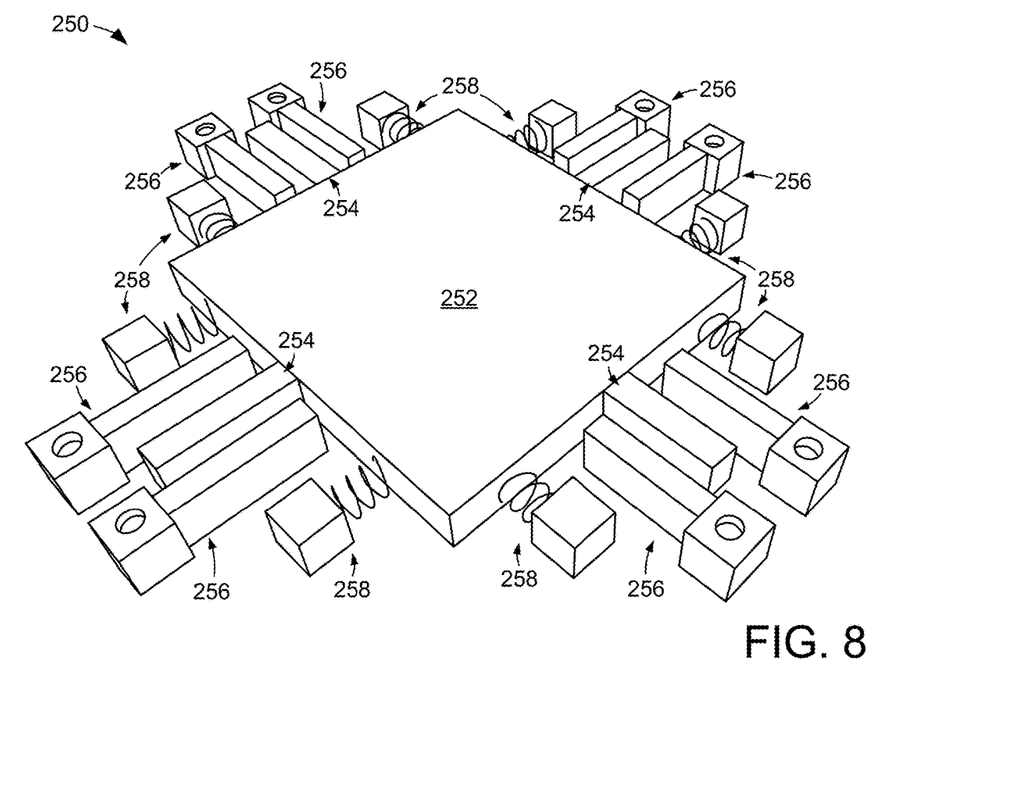
FIG. 8 depicts portions of an example sensor that can be employed in a drop table in accordance with various embodiments.

FIG. 8 depicts portions of an example sensor 250 constructed and operated in accordance with some embodiments as part of a drop table system. The sensor 250 has a mass 252 that consists of protrusions 254. Movement of the mass and protrusions 252/254 relative to stationary leads 256 via one or more suspensions 258 provide at least tilt measurements for the surface to which the leads 256 are attached. That is, at least one suspension 258 allows the mass 252 and protrusions 254 to move in response to gravity to electrically and/or magnetically interact with the stationary leads 256 to indicate where, and to what degree, the surface on which the sensor 250 is mounted is tilted. In other words, the moving mass 252 and protrusions 254 can be mechanically free of the underlying surface while each lead is fixed onto the underlying surface that is being measured for orientation relative to level.

While the sensor 250 may be constructed as illustrated in FIG. 8, such components and configuration is not required or limiting. As such, any inclinometer sensor can be utilized by a drop table system to detect non-level orientation of a drop table platform. For instance, any mass that reacts to gravity can interact with any number and arrangement of stationary leads to indicate three-dimensional tilt direction and degree. Thus, a drop table can utilize a single inclinometer with at least one mass influenced by gravity to detect where, and how much, platform tilt is occurring.

Figure 9:
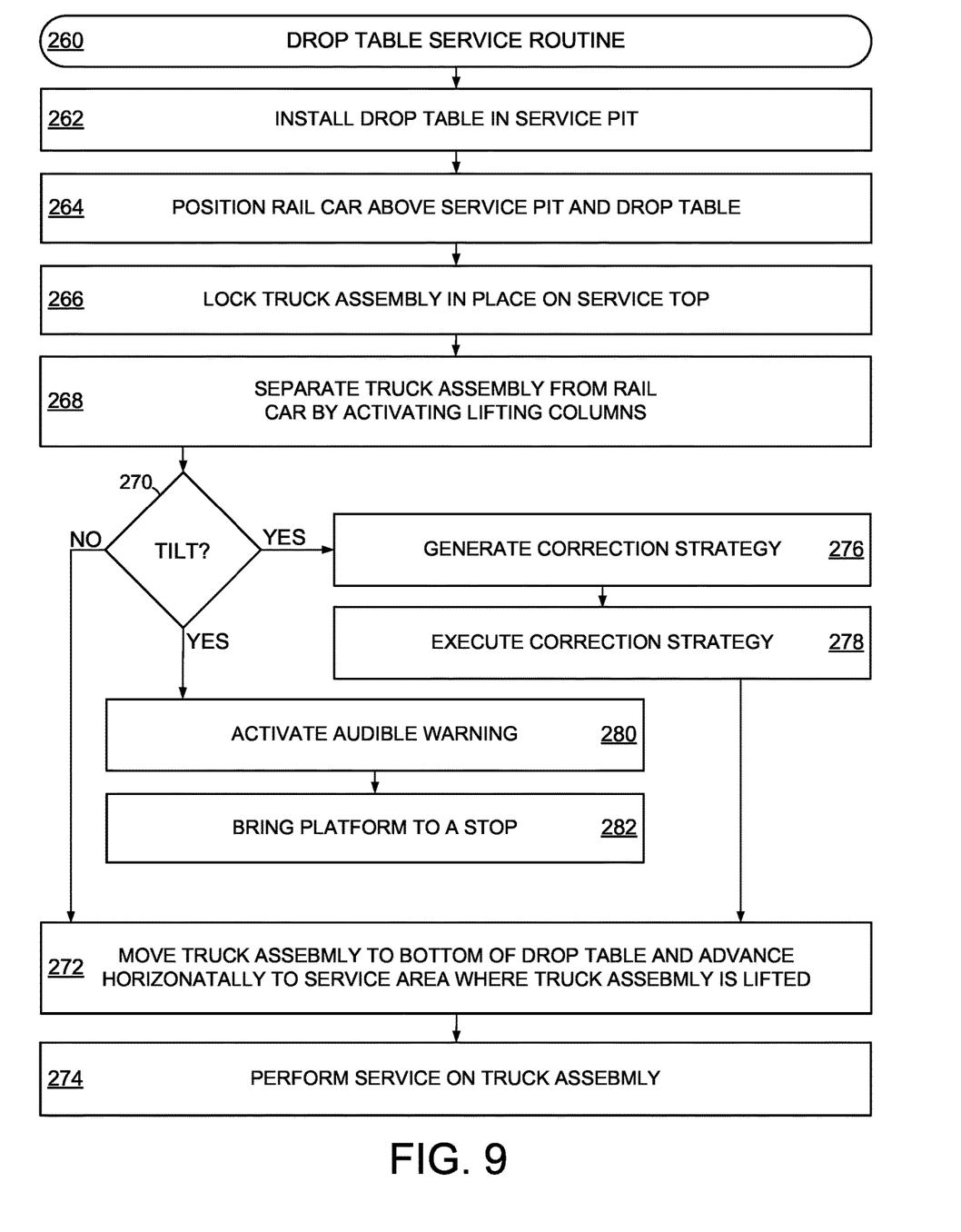
FIG. 9 is a flowchart of an example drop table service routine carried out with the assorted embodiments of FIGS. 1-8.

FIG. 9 is a flowchart of an example drop table service routine 260 that can be carried out with the various embodiments of FIGS. 1-8. A drop table system is initially installed in step 262 in a service pit with lifting columns extending from a base to a platform that presents a service top, as generally shown in FIGS. 3A-6. A rail car, or locomotive engine, is positioned over the service pit in step 264 so that a truck assembly of the rail car, which may consist of the entire truck assembly or simply a traction motor of the truck assembly, contacts the service top of the drop table. The truck assembly wheels are locked in place in step 266 before the truck assembly is separated from the rail car/engine in step 268 by lowering the service top and platform via cross beams and lifting column activation from a pair of electric motors located in the base of the drop table.

At any time after the truck assembly/motor is separated from the rail car/engine and wholly supported by the drop table, a single inclinometer sensor measures the physical orientation of the drop table platform, which allows decision 270 to determine if the platform, and connected service top, are not level with a ground level and base of the drop table. For example, decision 270 can continuously, cyclically, or sporadically monitor platform orientation to determine if the platform is currently not level, or parallel to the ground level with a 0 degree position along the X-Y plane. A determination that the platform is level advances routine 260 to step 272 where the drop table proceeds to horizontally move the truck assembly/motor to a service area that is then accessed by lifting the truck assembly/motor via the lifting columns to allow step 274 to perform maintenance, repair, and other service on the truck assembly/motor.

In the event decision 270 detects a current, or imminent, tilting of the platform from level, a determination can be made as to the location and severity of the tilt. If the tilt is within a correctable range at a correctable position, then step 276 generates a correction strategy with a drop table controller that is carried out in step 278 by altering at least one operational parameter before returning to decision 270 to verify the tilt has been corrected. For instance, the drop table controller can utilize one or more generated algorithms indicative of the drop table lifting configuration to identify from the single sensor where the platform is too high and/or too low. It is noted that the use of a single three-dimensional sensor requires such algorithmic computation of where a tilt is present due to the presence of multiple connected lifting columns.

The determination of whether a tilt is correctable can be conducted spontaneously by the drop table controller based on a variety of predetermined parameters, such as weight of the truck assembly, position of the platform relative to the drop table base, speed of lifting/lowering, and detected center of gravity of the truck assembly relative to the geometric center of the platform. The generated correction strategy can comprise any number of reactive and/or proactive actions that are collectively designed to return the platform to a level orientation. As an example, a correction strategy may be to reduce power to one motor, increase power to one motor, change gear ratios, reduce lifting/lowering speed, and temporarily lock a lifting column.

A determination that a tilt is not correctable, or is not safe to attempt to correct, triggers step 280 to sound an audible warning so that any personnel in and around the service pit is altered of a dangerous situation. The audible warning prompts the drop table controller to bring the platform to a stop as safely as possible in step 282 to minimize the risk of drop table failure or truck assembly movement from the service top. Step 282 may involve continued platform motion and/or locking of one or more lifting columns, as determined by the drop table controller, to reduce the risk of losing control of the truck assembly or components of the drop table itself.

It is contemplated a correction strategy can conduct a variety of risk mitigation actions in an effort to return the platform to a level orientation. For instance, the drop table controller can maintain a certain amount of platform tilt while changing lifting/lowering speed until the lifting columns reach a limit stop (top or bottom) of the respective lifting columns. Another non-limiting example of a correction strategy involves utilizing the cross beam connection of different motors to conduct a pattern of movements among connected lifting columns to induce a reduction in platform tilt, such as pulsating one motor at a greater frequency than the other motor. The diverse capabilities of a correction strategy allows a drop table controller to mitigate risks to component and personnel.

Through the assorted embodiments of a drop table system, efficiency, performance, and safety can be improved. By connecting lifting columns powered by different motors with a cross beam, motor feedback can more accurately depict the condition of the drop table, particularly the respective longitudinal sides. The cross beams support a rigid platform that provides increased stiffness that allows for increased tilt detection precision while decreasing the lifting distance and service pit depth required to service a truck assembly. Employing a single inclinometer at the geometric center of a platform can provide fast and accurate tilt measurements without concern for contamination degradation from dirt, liquids, and other contaminants. The use of a single inclinometer to generate a correction strategy allows a drop table controller to adapt to real-time conditions to provide intelligent corrective actions that have component wear and personnel safety in focus.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a drop table platform suspended by at least one lifting column connected to a controller, the controller connected to a single inclinometer positioned at a geometric center of the drop table platform to continuously detect tilt of the drop table platform as the drop table platform is respectively raised and lowered between a lowest elevational position and a highest elevational position.

2. The apparatus of claim 1, wherein the inclinometer comprises a mass suspended relative to stationary leads.

3. The apparatus of claim 2, wherein a protrusion of the mass extends between a pair of stationary leads.

4. The apparatus of claim 2, wherein the mass is suspended above the drop table platform while the stationary leads are fixed onto the drop table platform.

5. The apparatus of claim 2, wherein four separate protrusions each extend from the mass and respectively interact with different pairs of stationary leads.

6. The apparatus of claim 2, wherein the mass reacts relative to gravity to identify a location of drop table platform tilt and a degree of drop table platform tilt.

7. The apparatus of claim 1, wherein the inclinometer is positioned atop the drop table platform.

8. The apparatus of claim 1, wherein the inclinometer is positioned on an underside of the drop table platform.

9. The apparatus of claim 1, wherein the drop table comprises a pair of spaced apart railroad track sections configured to raise and lower a railroad truck assembly through a service pit opening.

10. The apparatus of claim 1, wherein the inclinometer is packaged in a sealed container.

11. The apparatus of claim 1, wherein the tilt identified by the controller using the single inclinometer comprises an amount and location of deviation of a periphery of the drop table platform from a horizontally level plane defined by first and second orthogonal axes, and wherein the controller is further configured to adjust an elevational position of at least one of the at least one lifting column responsive to the amount and location of deviation of the periphery of the drop table platform from the horizontally level plane.

12. The apparatus of claim 1, wherein the controller determines the tilt of the drop table platform as three-dimensional tilt thereof solely from the single inclinometer and independently of any sensors coupled to the at least one lifting column.

13. The apparatus of claim 1, wherein the controller detects the tilt of the drop table platform along multiple orthogonal dimensions using only the single inclinometer.

14. The apparatus of claim 1, wherein the drop table platform comprises a rectangularly shaped top surface and a plurality of stiffening beams to impart stiffness to the rectangularly shaped top surface, wherein the geometric center is disposed at an intersection of first and second orthogonal centerlines of the drop table platform, and wherein the single inclinometer is aligned with the intersection and attached at a position above or below the rectangularly shaped top surface.

15. A method comprising:
connecting a controller to at least one lifting column and a single inclinometer, the inclinometer positioned at a geometric center of a drop table platform;
suspending the drop table platform with the at least one lifting column;
supporting a railroad truck assembly on rails of the drop table platform at an uppermost extent of the at least one lifting column;
lowering the drop table platform and the railroad truck assembly to a lowermost extent of the at least one lifting column; and
during the lowering step, detecting tilt of the drop table platform with the inclinometer at an intermediate location between the uppermost extent and the lowermost extent, and correcting the tilt of the drop table platform by altering operation of the at least one lifting column to orient the drop table platform in a level configuration.

16. The method of claim 15, wherein the level configuration is perpendicular to gravity, and the railroad truck assembly has a center of gravity that is offset from the geographic center of the drop table platform.

17. The method of claim 15, wherein the inclinometer detects drop table platform tilt alone.

18. The method of claim 15, wherein the controller generates a correction strategy in response to the detection of drop table platform tilt.

19. The method of claim 15, wherein the correction strategy reduces power to less than all the lifting columns connected to the drop table platform to correct the tilt and return the drop table platform to the level configuration.

20. The method of claim 15, wherein the correction strategy maintains a predetermined amount of drop table platform tilt while the at least one lifting column moves the drop table platform from a first vertical position to a second vertical position prior to correcting the tilt.

21. The method of claim 15, wherein the correction strategy pulsates a first motor connected to a first lifting column of the at least one lifting columns at a greater frequency than a second motor connected to a second lifting column of the at least one lifting columns.

22. The method of claim 15, wherein the controller detects a location and severity of drop table platform tilt in three dimensions.

23. The method of claim 15, wherein the controller determines if the detected tilt can be corrected based on a center of gravity of the drop table platform determined by the controller.

24. The method of claim 15, wherein the controller predicts drop table platform tilt will occur in the future.

25. The method of claim 15, wherein the tilt identified by the controller using the single inclinometer comprises an amount and location of deviation of a periphery of the drop table platform from a horizontally level plane defined by first and second orthogonal axes, and wherein the controller is further configured to adjust an elevational position of at least one of the at least one lifting column responsive to the amount and location of deviation of the periphery of the drop table platform from the horizontally level plane.

26. The method of claim 15, wherein the drop table platform comprises a rectangularly shaped top surface and a plurality of stiffening beams to impart stiffness to the rectangularly shaped top surface, wherein the geometric center is disposed at an intersection of first and second orthogonal centerlines of the drop table platform, and wherein the single inclinometer is aligned with the intersection and attached at a position above or below the rectangularly shaped top surface.

27. A drop table system, comprising:
a drop table platform configured to support a railroad truck assembly;
a plurality of lifting columns configured to concurrently lower the drop table platform while maintaining the drop table platform in a nominally horizontal table orientation;
a single inclinometer positioned at a geometric center of the drop table platform to detect tilt of the drop table platform as deviation from the nominal horizontal table orientation as the drop table platform is lowered; and
a controller configured to interrupt further lowering of the drop table platform by the plurality of columns responsive to the detected tilt.

28. The system of claim 27, wherein the drop table platform comprises a pair of spaced apart rails that extend upwardly from a platform surface to contactingly engage wheels of the railroad truck assembly, wherein the platform surface is configured to be nominally flush with a shop floor surface to cover an opening into a service pit into which the drop table platform is lowered, and wherein the inclinometer is affixed to the platform surface.

* * * * *